(12) United States Patent
Kwon et al.

(10) Patent No.: US 9,197,802 B2
(45) Date of Patent: Nov. 24, 2015

(54) CAMERA MODULE

(71) Applicant: SAMSUNG ELECTRO-MECHANICS CO., LTD., Suwon (KR)

(72) Inventors: Oh Byoung Kwon, Suwon (KR); Sung Hoon Kim, Suwon (KR); Kyeong Jun Kim, Suwon (KR); Yoo Chang Kim, Suwon (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 7 days.

(21) Appl. No.: 14/056,750

(22) Filed: Oct. 17, 2013

(65) Prior Publication Data

US 2015/0062421 A1 Mar. 5, 2015

(30) Foreign Application Priority Data

Aug. 27, 2013 (KR) ........................ 10-2013-0101818

(51) Int. Cl.
*H04N 5/225* (2006.01)
(52) U.S. Cl.
CPC ........... *H04N 5/2257* (2013.01); *H04N 5/2254* (2013.01)
(58) Field of Classification Search
CPC H04N 5/23212; H04N 5/2353; H04N 5/2254
USPC ........................................ 348/357, 373, 374
See application file for complete search history.

(56) References Cited

U.S. PATENT DOCUMENTS

| 7,450,834 | B2 * | 11/2008 | Makii et al. ...................... 396/55 |
| 7,675,566 | B2 * | 3/2010 | Tagome et al. ............... 348/357 |
| 8,107,006 | B2 * | 1/2012 | Sekimoto et al. ............. 348/374 |
| 8,354,762 | B2 * | 1/2013 | Chiang ........................... 310/38 |
| 2006/0275032 | A1 * | 12/2006 | Hong et al. .................... 396/439 |
| 2008/0259470 | A1 * | 10/2008 | Chung .......................... 359/823 |
| 2010/0182490 | A1 * | 7/2010 | Seol et al. .................... 348/345 |
| 2011/0063495 | A1 * | 3/2011 | Tseng et al. .................. 348/357 |
| 2011/0236008 | A1 * | 9/2011 | Kang et al. .................... 396/133 |
| 2013/0194491 | A1 * | 8/2013 | Kudo ............................ 348/375 |

FOREIGN PATENT DOCUMENTS

| KR | 10-2007-0013858 A | 1/2007 |
| KR | 10-2010-0001519 A | 6/2010 |
| KR | 10-2012-0010421 A | 2/2012 |

OTHER PUBLICATIONS

Office Action dated Jan. 16, 2015 for Korean Patent Application No. 10-2013-0101818 and its English summary provided by Applicant's foreign counsel.
Korean Office Action issued on Jul. 17, 2015 in counterpart Korean Application No. 10-2013-0101818.

* cited by examiner

*Primary Examiner* — James Hannett
(74) *Attorney, Agent, or Firm* — NSIP Law

(57) ABSTRACT

There is provided a camera module including: a lens barrel including at least one lens disposed on an optical axis; a housing having the lens barrel disposed therein; and first and second elastic members elastically supporting upper and lower portions of the lens barrel, respectively, wherein the first and second elastic members include a fixed side coupled to the housing and a driving side coupled to the lens barrel, respectively, the fixed side and the driving side being disposed to face each other based on the optical axis.

13 Claims, 3 Drawing Sheets

CAMERA MODULE

CROSS-REFERENCE TO RELATED APPLICATIONS

This application claims the priority of Korean Patent Application No. 10-2013-0101818 filed on Aug. 27, 2013, in the Korean Intellectual Property Office, the disclosure of which is incorporated in its entirety herein by reference.

BACKGROUND OF THE INVENTION

Field of the Invention

The present invention relates to a camera module.

Description of the Related Art

Recently, portable communications terminals such as cellular phones, personal digital assistants (PDAs), portable personal computers (PCs), and the like, have generally been implemented with the ability to transmit video data in addition to text and audio data.

In accordance with this trend, camera modules have recently been standardly installed in portable communications terminals in order to enable the transmission of video data, facilitate video chatting, and the like.

Generally, the camera module includes a lens barrel having a lens disposed therein, a housing receiving the lens barrel therein, and an image sensor converting an image of a subject into an electrical signal.

In addition, a single focus type camera module imaging a subject with a fixed focus may be adopted as the camera module. However, recently, in accordance with the development of technology, a camera module including an actuator so that auto-focusing may be performed has been adopted.

As one such an actuator, a voice coil motor generating driving force by an interaction between a magnet and a coil has been used.

Generally, a the voice coil motor type actuator has a structure in which a plurality of magnets, having coils wound therearound, are disposed in the vicinity of a lens barrel, such that the coils and the lens barrel are driven together and the plurality of magnets are fixed.

In this case, a space in which the plurality of magnets are fixed is required, such that a size of the camera module is increased, and a structure of the camera module may be relatively complicated, in order to prevent disconnection of the coil during driving of the camera module.

SUMMARY OF THE INVENTION

An aspect of the present invention provides a camera module capable of satisfying demands for slimness and miniaturization.

An aspect of the present invention also provides a camera module capable of preventing generation of a tilting phenomenon during driving of a lens barrel and allowing the lens barrel to be linearly moved stably.

According to an embodiment of the present invention, there is provided a camera module including: a lens barrel including at least one lens disposed on an optical axis; a housing having the lens barrel disposed therein; and first and second elastic members elastically supporting upper and lower portions of the lens barrel, respectively, wherein the first and second elastic members include a fixed side coupled to the housing and a driving side coupled to the lens barrel, respectively, the fixed side and the driving side being disposed to face each other based on the optical axis.

The lens barrel may have a magnet mounted thereon so that one surface of the magnet is exposed to the outside, and the lens barrel and the magnet may have a first yoke disposed therebetween so as to enclose surfaces of the magnet other than one surface of the magnet.

The housing may have a coil and a second yoke attached thereto, the coil being disposed to face the magnet and the second yoke enclosing the coil.

The driving side may be positioned to be close to the magnet based on the optical axis, and the fixed side may be positioned to be opposite to the driving side based on the optical axis.

Initial positions of the fixed side and the driving side may be different from each other in an optical axis direction.

An initial position of the fixed side may be behind that of the driving side in an optical axis direction.

The first and second elastic members may further include a connecting side connecting the fixed side and the driving side to each other, respectively.

The connecting side may have a connecting portion and a bent portion extended from the connecting portion.

The bent portion may be extended from one end of the connecting portion and be connected to the fixed side, and the other end of the connecting portion may be connected to the driving side.

The bent portion may be branched and extended from one end of the connecting portion into two portions, and the branched portions may be connected to the fixed side, respectively.

A single closed curve may be formed by the bent portion and the fixed side.

The bent portion may be extended from at least one of one end and the other end of the connecting portion.

A width of the bent portion may be smaller than that of the connecting portion.

According to another aspect of the present invention, there is provided a camera module including: a lens barrel including at least one lens disposed on an optical axis; a magnet indirectly attached to the lens barrel through a first yoke directly attached to one side of the lens barrel; a housing having the lens barrel disposed therein; and first and second elastic members elastically supporting upper and lower portions of the lens barrel, respectively, wherein the first and second elastic members include a driving side coupled to one side of the lens barrel and a fixed side coupled to the housing, respectively, the fixed side being fixed to one side of the housing corresponding to the other side of the lens barrel.

An initial position of the fixed side may be behind that of the driving side in an optical axis direction.

The first yoke may enclose the magnet so that one surface of the magnet is exposed to the outside.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
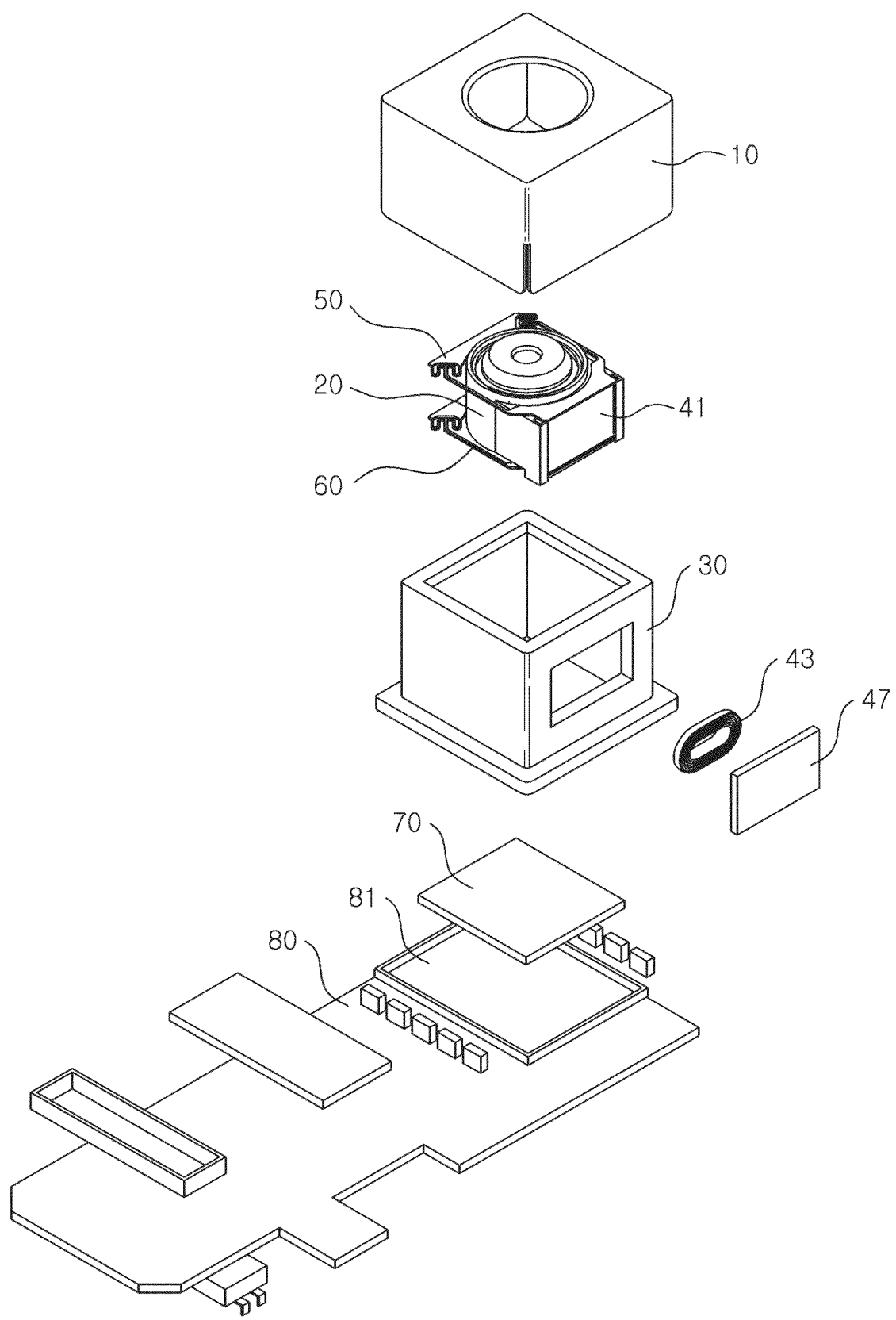
FIG. 1 is an exploded perspective view of a camera module according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

FIG. 1 is an exploded perspective view of a camera module according to an embodiment of the present invention.

Referring to FIG. 1, the camera module according to the embodiment of the present invention may include a lens barrel 20, a housing 30, a case 10, a first elastic member 50, a second elastic member 60, an infrared filter 70, an image sensor 81, and a printed circuit board 80.

First, terms with respect to directions will be defined. An optical axis direction refers to a vertical direction based on the lens barrel 20, and a horizontal direction refers to a direction perpendicular to the optical axis direction.

The lens barrel 20 may have a hollow cylindrical shape so that at least one lens imaging a subject may be received therein, and the lens may be disposed in the lens barrel 20 on an optical axis.

The lens barrel 20 may be coupled to the housing 30. More specifically, the lens barrel 20 may be disposed in the housing 30.

Here, the lens barrel 20 may be moved in the optical axis direction for auto-focusing.

In order to move the lens barrel 20 in the optical axis direction, a magnet 41 may be mounted on the lens barrel 20, and a coil 43 may be disposed to face the magnet 41.

A coupling structure between the magnet 41 and the lens barrel 20 will be described below with reference to FIG. 2.

The coil 43 may move the lens barrel 20 in the optical axis direction by attractive force and repulsive force generated by the magnet 41 adjacent thereto.

In addition, the coil 43 may have a second yoke 47 attached thereto and be attached to the housing 30 through the second yoke 47, and leakage of a magnetic flux may be prevented by the second yoke 47 enclosing the coil 43.

The magnet 41 may generate a predetermined magnetic field, generate driving force by electromagnetic influence between the magnet 41 and the coil 43 while power is applied to the coil 43, and move the lens barrel 20 in the optical axis direction by the driving force.

Meanwhile, the coil 43 may have a position sensor (not shown) disposed at the center thereof.

The position sensor (not shown) may sense a current position of the lens barrel 20 and provide information on the current position to a controller (not shown), and the controller (not shown) may control the movement of the lens barrel 20 using the information on the current position transmitted from the position sensor (not shown) and information on a destination position to which the lens barrel 20 is to be moved.

Since the position sensor (not shown) is disposed at the center of the coil 43, a separate space for disposing the position sensor (not shown) may not be required in the housing 30. Therefore, an actuator may be miniaturized and a manufacturing tolerance in a manufacturing process may be decreased.

Meanwhile, upper and lower portions of the lens barrel 20 may be elastically supported by the first and second elastic members 50 and 60, respectively.

The first and second elastic members 50 and 60 will be described below in detail with reference to FIGS. 2 through 4.

The case 10 may be coupled to the housing 30 so as to enclose an outer surface of the housing 30 and serve to shield an electromagnetic wave generated during driving of the camera module.

That is, the camera module may generate the electromagnetic waves while being driven. In the case in which the electromagnetic waves are emitted to the outside of the camera module, the electromagnetic waves may have an effect on other electronic components to cause interference with communications or malfunctions thereof.

Therefore, in order to prevent the electromagnetic waves from being emitted to the outside of the camera module, the case 10 may be coupled to the housing 30.

Here, the case 10 may be grounded to a ground pad (not shown) provided on the printed circuit board to shield the electromagnetic waves.

The case 10 may have a through-hole formed in an upper portion thereof so that external light may be incident through the lens barrel 20, wherein the external light incident through the through-hole may be received by the image sensor 81 having passed through the lens.

The image sensor 81, such as a charge coupled device (CCD) or a complementary metal oxide semiconductor (CMOS), may be mounted on the printed circuit board 80 through wire bonding, and the printed circuit board 80 may be coupled to the bottom of the housing 30.

An image of a subject may be collected in the image sensor 81 and be stored as data in a memory in a device, and the stored data may be displayed as the image by a display medium in the device.

Here, the lens barrel 20 and the image sensor 81 may have the infrared filter 70 disposed therebetween.

That is, the infrared filter 70 may be disposed behind the lens barrel 20.

When the light passing through the lens passes through the infrared filter 70, an infrared ray in the light may be cut off. Therefore, introduction of the infrared ray into the image sensor 81 may be prevented.

The infrared filter 70 may be formed of a glass material and be manufactured by depositing several materials having different refractive indices on a surface in order to block light in an infrared region.

The infrared filter 70 may be bonded to an inner surface of the housing 30. That is, the infrared filter 70 and the housing 30 may be bonded to each other through an ultraviolet (UV) curing adhesive (not shown).

Figure 2:
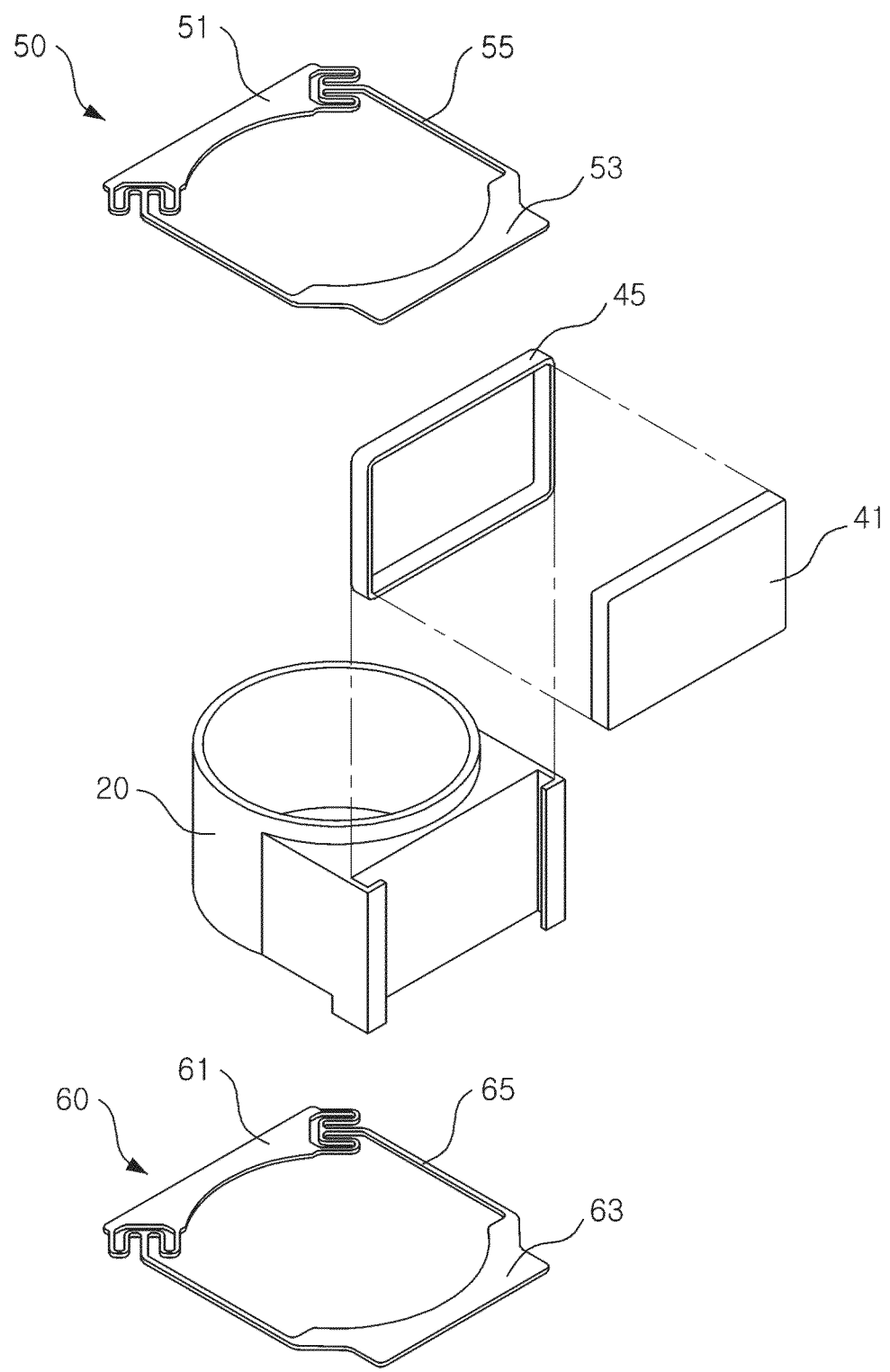
FIG. 2 is an exploded perspective view of a first elastic member, a second elastic member, a lens barrel, a first yoke, and a magnet of the camera module according to the embodiment of the present invention.

FIG. 2 is an exploded perspective view of a first elastic member, a second elastic member, a lens barrel, a first yoke, and a magnet of the camera module according to the embodiment of the present invention; FIG. 3 is a plan view of the first elastic member of the camera module according to the embodiment of the present invention; and FIG. 4 is a schematic cross-sectional view of the camera module according to the embodiment of the present invention.

A coupling structure between the lens barrel 20 and the magnet 41 will be first described with reference to FIG. 2.

The lens barrel 20 may have the magnet 41 mounted thereon so that one surface of the magnet 41 is exposed to the outside, and the lens barrel 20 and the magnet 41 may have a first yoke 45 disposed therebetween.

More specifically, the lens barrel 20 may have the first yoke 45 attached to one side thereof, and the magnet 41 may be attached to the first yoke 45. That is, the magnet 41 may be indirectly attached to the lens barrel 20 through the first yoke 45 directly attached to the lens barrel 20.

The first yoke 45 may be coupled to the magnet 41 so as to enclose surfaces of the magnet 41 other than one surface of the magnet 41.

Therefore, the magnet 41 may be mounted on the lens barrel 20 so that one surface thereof is exposed to the outside.

In the camera module according to the embodiment of the present invention, the magnet 41 may only be mounted on one side of the lens barrel 20 and interact with the coil 43, such that the lens barrel 20 and the magnet 41 may be driven.

That is, in the embodiment of the present invention, the coil 43 and the second yoke 47 may be fixed to the housing 30, and the first yoke 45 and the magnet 41 may be driven together with the lens barrel 20.

Therefore, a disconnection problem of the coil that may be generated in the case in which the coil is wound around the lens barrel, such that the coil and the lens barrel are driven together with each other may be fundamentally prevented, the number of magnets and a space in which the magnets are mounted may be decreased, which may be advantageous for miniaturization of the camera module, and the number of components, the number of manufacturing processes, and manufacturing costs may be decreased.

Hereinafter, the first and second elastic members 50 and 60 will be described with reference to FIGS. 3 and 4.

The first and second elastic members 50 and 60 may elastically support the upper and lower portions of the lens barrel 20, respectively.

That is, in the camera module according to the embodiment of the present invention, since the magnet 41 is only attached to one side of the lens barrel 20, there is a risk that a tilting phenomenon will be generated during driving the lens barrel 20.

Therefore, in the camera module according to the embodiment of the present invention, in order to prevent the tilting phenomenon that may be generated during driving the lens barrel 20, the first and second elastic members 50 and 60 may be used so as to support the upper and lower portions of the lens barrel 20, respectively.

The first and second elastic members 50 and 60 may have fixed sides 51 and 61 and driving sides 53 and 63, respectively.

Here, the driving sides 53 and 63 refer to portions driven together with the lens barrel 20 during driving the lens barrel 20, and the fixed sides 51 and 61 refer to portions fixed, regardless of driving of the lens barrel 20.

The fixed sides 51 and 61 may be coupled and fixed to the housing 30, and the driving sides 53 and 63 may be coupled to the lens barrel 20 to thereby be driven together with the lens barrel 20.

The fixed sides 51 and 61 and the driving sides 53 and 63 may be disposed to face each other based on the optical axis.

That is, the driving sides 53 and 63 may be positioned to be close to the magnet 41 based on the optical axis, and the fixed sides 51 and 61 may be positioned to be opposite to the driving sides 53 and 63 based on the optical axis.

In other words, the driving sides 53 and 63 may be coupled to one side of the lens barrel 20 to which the magnet 41 is attached, and the fixed sides 51 and 61 may be fixed to one side of the housing 30 corresponding to the other side of the lens barrel 20.

Here, initial positions of the fixed sides 51 and 61 and the driving sides 53 and 63 (states of the fixed sides 51 and 61 and the driving sides 53 and 63 before the lens barrel 20 is driven) may be different from each other in the optical axis direction.

That is, any one of the fixed sides 51 and 61 and the driving sides 53 and 63 may be positioned behind the other in the optical axis direction.

More specifically, the initial positions of the fixed sides 51 and 61 may be behind those of the driving sides 53 and 63 in the optical axis direction (that is, at a position therebehind in the optical axis direction).

Due to force caused by a length difference between the fixed sides 51 and 61 and the driving sides 53 and 63, a position of the lens barrel 20 may be constantly maintained when a current is not applied and an influence due to disturbance such as external vibrations, or the like, may be decreased.

In other words, since the driving sides 53 and 63 are positioned in front of the fixed sides 51 and 61 in the optical axis direction, force directed rearwardly in the optical axis direction may be applied to the driving sides 53 and 63 by elastic force of the first and second elastic members 50 and 60 themselves.

Therefore, since the force directed rearwardly in the optical axis direction is applied to the lens barrel 20 even when the current is not applied, the position of the lens barrel 20 may be constantly maintained and an influence due to disturbance, or the like, may be decreased.

Figure 3:
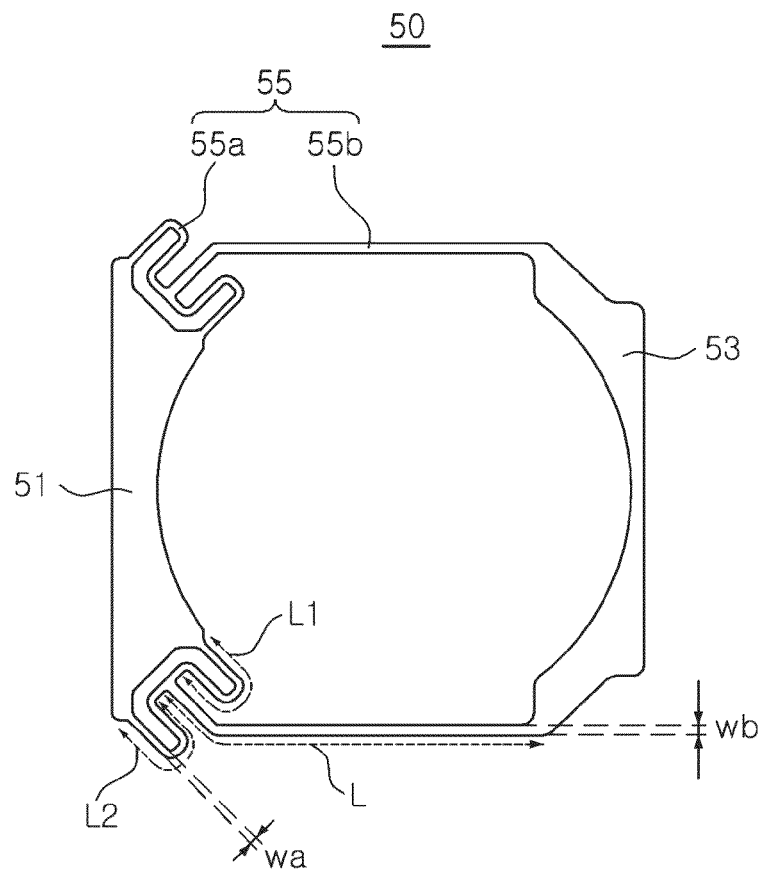
FIG. 3 is a plan view of the first elastic member of the camera module according to the embodiment of the present invention.
Figure 4:
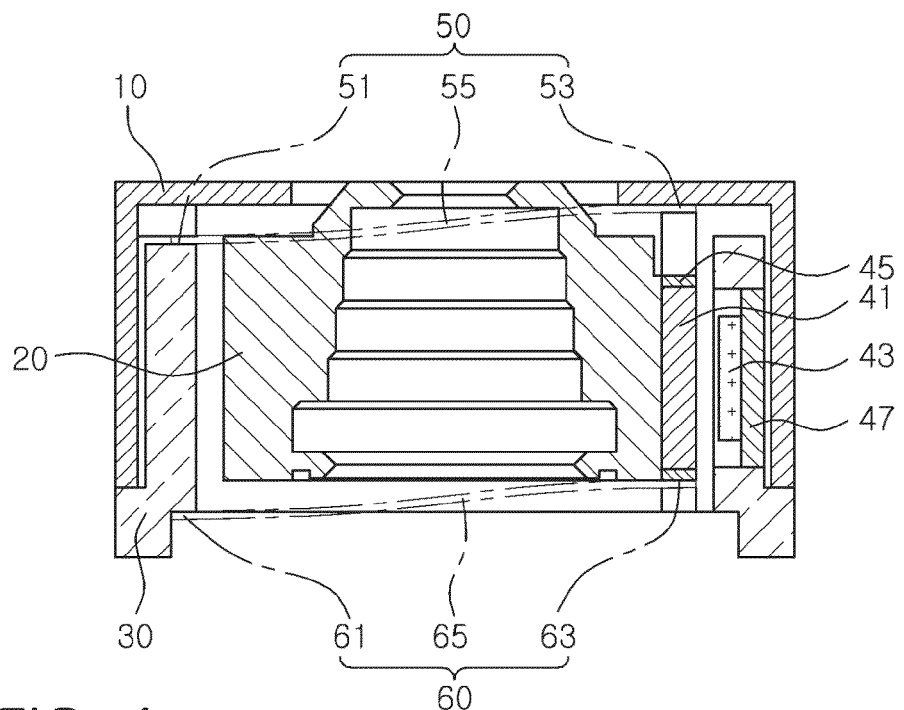
FIG. 4 is a schematic cross-sectional view of the camera module according to the embodiment of the present invention.

Meanwhile, referring to FIG. 3, the first elastic member 50 may further include a connecting side 55 connecting the fixed side 51 and the driving side 53 to each other.

Although the first elastic member 50 is shown in FIG. 3, the second elastic member 60 may have the same structure as that of the first elastic member 50. Therefore, a description of the structure of the second elastic member 60 will be replaced by that of the structure of the first elastic member 50.

The connecting side 55 may have a connecting portion 55b and a bent portion 55a extended from the connecting portion 55b.

The bent portion 55a may be extended from one end of the connecting portion 55b and be connected to the fixed side 51, and the other end of the connecting portion 55b may be connected to the driving side 53.

Here, the bent portion 55a may be branched and extended from one end of the connecting portion 55b into two portions, and the branched portions may be connected to the fixed side 51, respectively.

Therefore, a single closed curve may be formed by the bent portion 55a and the fixed side 51.

That is, a single space enclosed by the bent portion 55a and the fixed side 51 may be formed.

Although the case in which the bent portion 55a is formed only between the fixed side 51 and the connecting portion 55b is shown in FIG. 3, the present invention is not limited thereto. That is, the bent portions 55a may be extended from both of one end and the other end of the connecting portion 55b and be connected to the fixed side 51 and the driving side 53, respectively.

That is, the bent portion 55a may be extended from at least one of one end and the other end of the connecting portion 55b.

Meanwhile, a width wa of the bent portion 55a may be smaller than a width wb of the connecting portion 55b.

Here, the following equation, wa<wb, may be satisfied.

A length L1 or L2 of one side (that is, one of two portions branched and extended from one end of the connecting portion 55b) of the bent portion 55a may be equal to or larger than ¼ of a length L of the connecting portion 55b.

That, the following equation may be satisfied:

$$L1 \text{ or } L2 \geq \frac{1}{4}L.$$

Through the above-mentioned configuration, generation of the tilting phenomenon during driving the lens barrel 20 may be effectively prevented and an influence by disturbance such as external vibrations, or the like, may be decreased.

Through the above-mentioned embodiment, in the camera module according to the embodiment of the present invention, the magnet 41 is disposed at one side of the lens barrel 20, such that the number of magnets and a space in which the magnets are mounted may be decreased, whereby the camera module may be slimmed and miniaturized.

In addition, the first and second elastic members 50 and 60 support both of the upper and lower portions of the lens barrel 20, respectively, and have the bent portions 55a and 65a, respectively, whereby the generation of the tilting phenomenon during driving the lens barrel 20 may be prevented.

As set forth above, with the camera module according to the embodiment of the present invention, demands for slimness and miniaturization may be satisfied, generation of a tilting phenomenon during driving the lens barrel may be prevented, and the lens barrel may be linearly moved stably.

While the present invention has been shown and described in connection with the embodiments, it will be apparent to those skilled in the art that modifications and variations can be made without departing from the spirit and scope of the invention as defined by the appended claims.

What is claimed is:

1. A camera module comprising:
   a lens barrel including at least one lens disposed on an optical axis;
   a housing having the lens barrel disposed therein; and
   first and second elastic members elastically supporting upper and lower portions of the lens barrel, respectively,
   wherein the first and second elastic members include a fixed side coupled to the housing and a driving side coupled to the lens barrel, respectively, the fixed side and the driving side being disposed to face each other based on the optical axis,
   wherein the first and second elastic members further include a connecting side connecting the fixed side and the driving side to each other, respectively,
   wherein the connecting side has a connecting portion and a bent portion extended from the connecting portion, and
   wherein the bent portion is extended from one end of the connecting portion and is connected to the fixed side, and the other end of the connecting portion is connected to the driving side.

2. The camera module of claim 1, wherein the lens barrel has a magnet mounted thereon so that one surface of the magnet is exposed to the outside, and the lens barrel and the magnet have a first yoke disposed therebetween so as to enclose surfaces of the magnet other than one surface of the magnet.

3. The camera module of claim 2, wherein the housing has a coil and a second yoke attached thereto, the coil being disposed to face the magnet and the second yoke enclosing the coil.

4. The camera module of claim 2, wherein the driving side is positioned to be close to the magnet based on the optical axis, and the fixed side is positioned to be opposite to the driving side based on the optical axis.

5. The camera module of claim 1, wherein initial positions of the fixed side and the driving side are different from each other in an optical axis direction.

6. The camera module of claim 1, wherein an initial position of the fixed side is behind that of the driving side in an optical axis direction.

7. A camera module comprising:
   a lens barrel including at least one lens disposed on an optical axis;
   a housing having the lens barrel disposed therein; and
   first and second elastic members elastically supporting upper and lower portions of the lens barrel, respectively,
   wherein the first and second elastic members include a fixed side coupled to the housing and a driving side coupled to the lens barrel, respectively, the fixed side and the driving side being disposed to face each other based on the optical axis,
   wherein the first and second elastic members further include a connecting side connecting the fixed side and the driving side to each other, respectively,
   wherein the connecting side has a connecting portion and a bent portion extended from the connecting portion, and
   wherein the bent portion is branched and extended from one end of the connecting portion into two portions, and the branched portions are connected to the fixed side, respectively.

8. The camera module of claim 7, wherein a single closed curve is formed by the bent portion and the fixed side.

9. The camera module of claim 1, wherein the bent portion is extended from at least one of one end and the other end of the connecting portion.

10. The camera module of claim 1, wherein a width of the bent portion is smaller than that of the connecting portion.

11. A camera module comprising:
    a lens barrel including at least one lens disposed on an optical axis;
    a housing having the lens barrel disposed therein;
    a driving part comprising a magnet provided to one side of the lens barrel and a coil provided to the housing so as to face the magnet, and
    an elastic member elastically supporting the lens barrel,
    wherein the elastic member includes a driving side coupled to the lens barrel, a fixed side coupled to the housing and a connecting side connecting the fixed side and the driving side to each other, and wherein a single closed curve is formed by the connecting side and the fixed side.

12. The camera module of claim 11, wherein an initial position of the fixed side is behind that of the driving side in an optical axis direction.

13. The camera module of claim 11, wherein a yoke is attached to the lens barrel and the yoke encloses the magnet so that one surface of the magnet is exposed to the outside.

* * * * *